(12) United States Patent
Fisher et al.

(10) Patent No.: US 6,598,793 B1
(45) Date of Patent: Jul. 29, 2003

(54) ARTICLE RECOGNITION AND VERIFICATION

(75) Inventors: John Fisher, Royston (GB); Paul Robertson, Royston (GB); Jon Burrell, Bourn (GB); David Cross, Letchworth (GB)

(73) Assignee: N.V. Bekaert S.A., Zwevegem (BE)

( * ) Notice: Subject to any disclaimer, the term of this patent is extended or adjusted under 35 U.S.C. 154(b) by 0 days.

(21) Appl. No.: 09/308,566

(22) PCT Filed: Dec. 8, 1997

(86) PCT No.: PCT/EP97/06969

§ 371 (c)(1),
(2), (4) Date: Jun. 30, 1999

(87) PCT Pub. No.: WO98/26377

PCT Pub. Date: Jun. 18, 1998

(30) Foreign Application Priority Data

Dec. 12, 1996 (EP) ............................. 96203529
Jul. 26, 1997 (GB) ............................. 9715727

(51) Int. Cl.[7] .................................................. G06K 7/08
(52) U.S. Cl. ...................................... 235/449; 235/450
(58) Field of Search ................................. 235/449, 450, 235/472.01, 493; 902/7, 11; 324/605, 606, 609, 617, 642; 194/212, 213

(56) References Cited

U.S. PATENT DOCUMENTS

| 3,313,941 A | 4/1967 | Marks |
| 3,449,585 A | 6/1969 | Trehub |
| 3,631,442 A | 12/1971 | Fearon |

(List continued on next page.)

FOREIGN PATENT DOCUMENTS

| DE | 26 35 795 | 8/1976 |
| DE | 26 35 795 | 3/1977 |
| DE | 3403516 | 9/1985 |
| EP | 0 295 085 | 6/1988 |
| EP | 0 295 229 A2 * | 12/1988 |
| EP | 0 413 534 A1 * | 2/1991 |
| EP | 0 625 766 | 5/1994 |
| EP | 0 632 398 | 6/1994 |
| EP | 0 656 607 | 12/1994 |
| EP | 0 153 286 | 2/1995 |
| FR | 763681 | 11/1993 |
| FR | 2 731 721 | 3/1995 |
| WO | 95/24000 | 8/1995 |
| WO | 96/14469 | 5/1996 |
| WO | 96/28611 | 9/1996 |
| WO | 98/26377 | 6/1998 |
| WO | 98/26378 | 6/1998 |

*Primary Examiner*—Diane I. Lee
(74) *Attorney, Agent, or Firm*—Shlesinger, Arkwright & Garvey LLP

(57) ABSTRACT

A method for checking the authenticity of a security article of the type containing magnetic particles having a magnetic saturation field $H_s$ being greater than 100 A/m. The method includes the following steps: (a) generating an alternating field of one or more fundamental frequencies; (b) subjecting an article to be detected to the field; (c) detecting a detection signal emanating from the article to be detected; and (d) examining the detection signal for the presence of any particular higher harmonics of the fundamental frequencies or of any linear combination of the fundamental frequencies and of the harmonics, the particular harmonics or the linear combination being indicative of the presence of the magnetic particles. The method is applied at point of transaction locations, where the article to be detected is brought into close proximity with a sensor.

55 Claims, 9 Drawing Sheets

U.S. PATENT DOCUMENTS

| | | | |
|---|---|---|---|
| 3,665,449 A | 5/1972 | Elder et al. | |
| 3,700,862 A | 10/1972 | Snook et al. | |
| 3,845,469 A | 10/1974 | Fishel et al. | 340/149 |
| 3,873,975 A | 3/1975 | Miklos et al. | |
| 3,978,318 A * | 8/1976 | Romeo et al. | 235/472.03 |
| 3,990,065 A | 11/1976 | Purinton et al. | |
| 4,114,032 A | 9/1978 | Brosow et al. | |
| 4,218,674 A * | 8/1980 | Brosow et al. | 340/149 |
| 4,265,703 A | 5/1981 | Terliska | |
| 4,298,862 A | 11/1981 | Gregor et al. | |
| 4,423,415 A | 12/1983 | Goldman | |
| 4,458,143 A | 7/1984 | Gitlis | 235/449 |
| 4,678,992 A | 7/1987 | Hametta | |
| 4,686,515 A | 8/1987 | Anderson et al. | |
| 4,820,912 A | 4/1989 | Samyn | |
| 5,003,291 A | 3/1991 | Strom-Olsen et al. | |
| 5,068,519 A | 11/1991 | Bryce | |
| 5,149,946 A | 9/1992 | Jerome et al. | 235/439 |
| 5,151,607 A * | 9/1992 | Crane | 250/556 |
| 5,166,501 A | 11/1992 | Wolley | |
| 5,279,403 A * | 1/1994 | Harbaugh et al. | 194/207 |
| 5,308,992 A * | 5/1994 | Crane et al. | 250/556 |
| 5,451,759 A | 9/1995 | Hoshino et al. | |
| 5,457,382 A * | 10/1995 | Stein | 324/239 |
| 5,535,871 A * | 7/1996 | Harbaugh | 194/206 |
| 5,545,882 A | 8/1996 | Tanaka | |
| 5,545,885 A | 8/1996 | Jagielinski | |
| 5,602,381 A | 2/1997 | Hoshino et al. | |
| 5,614,824 A * | 3/1997 | Dames et al. | 324/239 |
| 5,672,859 A | 9/1997 | Samyn et al. | |
| 5,682,103 A * | 10/1997 | Burrell | 324/642 |
| 5,698,839 A | 12/1997 | Jagielinski et al. | |
| 5,743,095 A | 4/1998 | Gschneidner, Jr. et al. | |
| 5,988,500 A | 11/1999 | Litman | |
| 5,992,601 A * | 11/1999 | Mennie et al. | 194/207 |
| 5,992,741 A | 11/1999 | Robertson et al. | |
| 6,019,208 A | 2/2000 | Vladymir | |
| 6,053,406 A | 4/2000 | Litman | |
| 6,202,929 B1 | 3/2001 | Verschuur et al. | |
| 6,257,488 B1 | 7/2001 | Robertson et al. | |

* cited by examiner

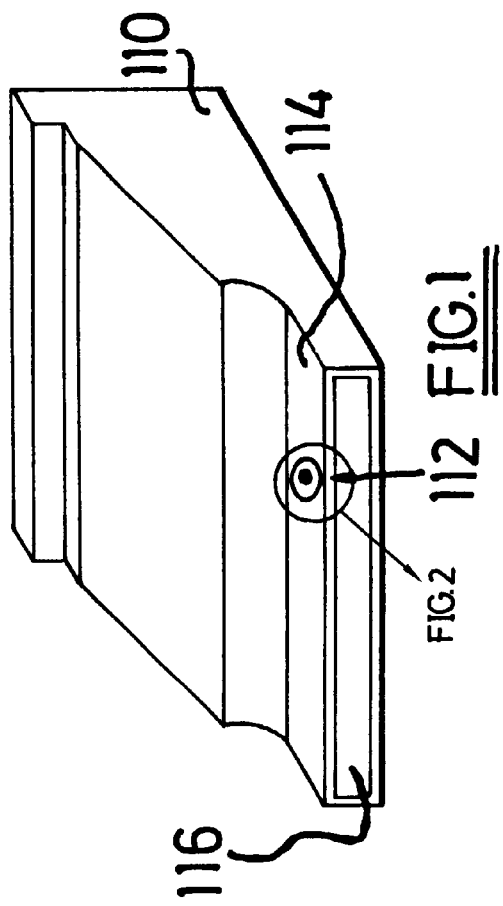
FIG. 1
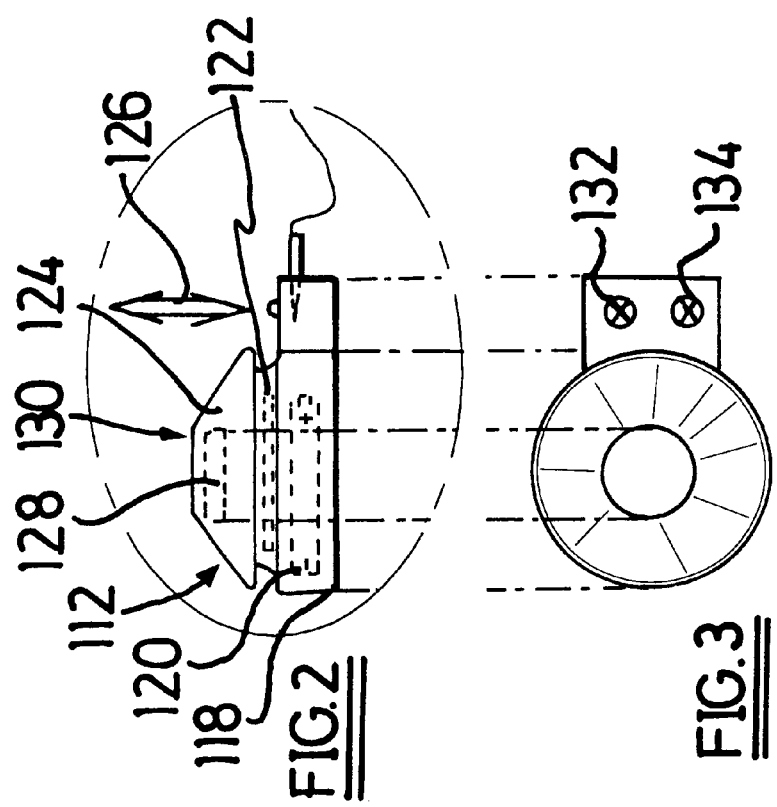
FIG. 2
FIG. 3

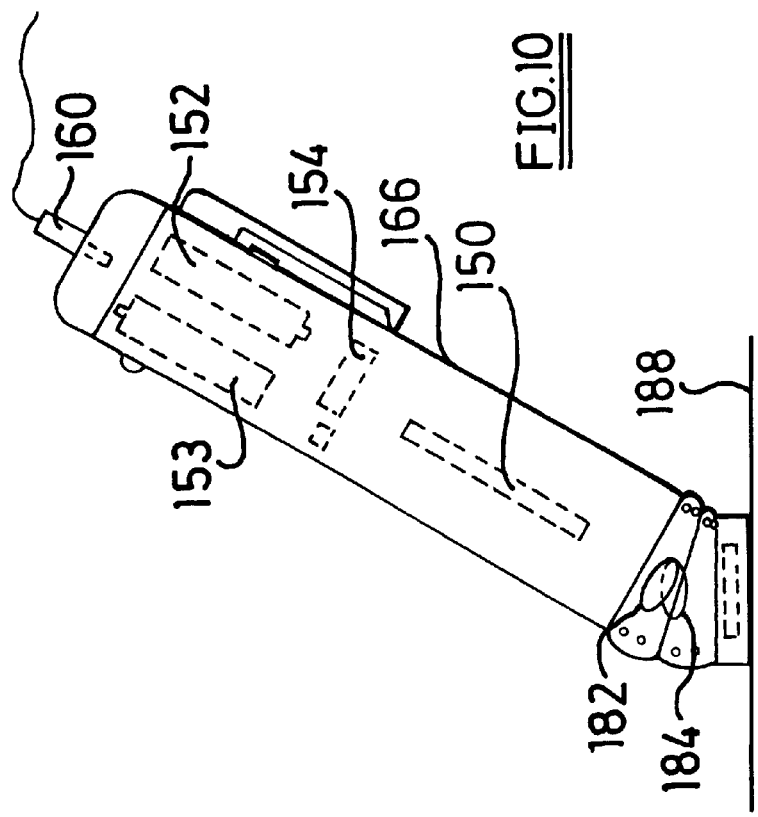
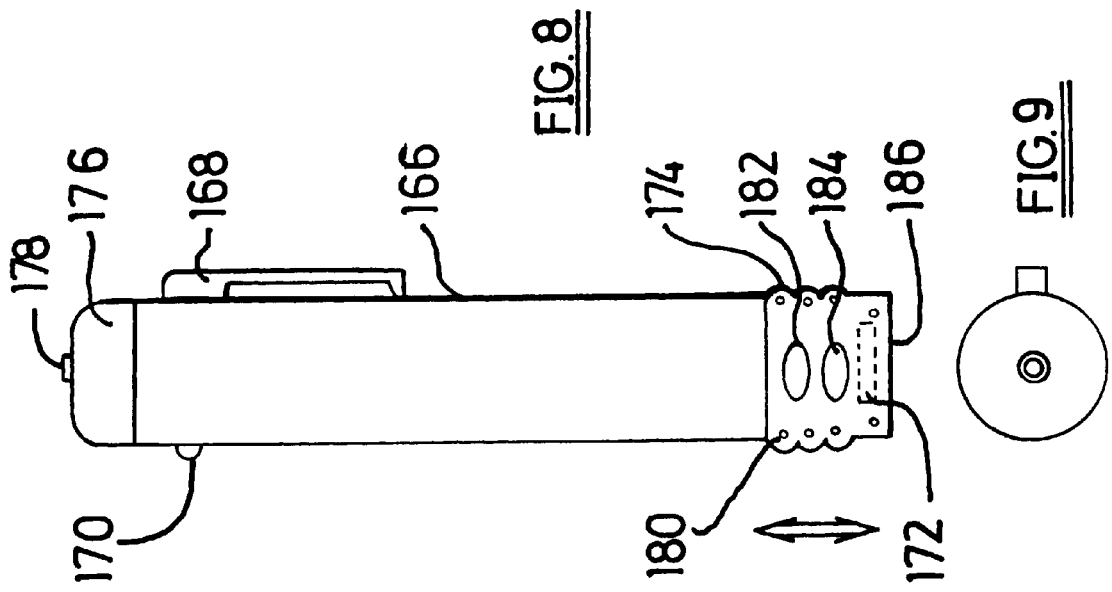

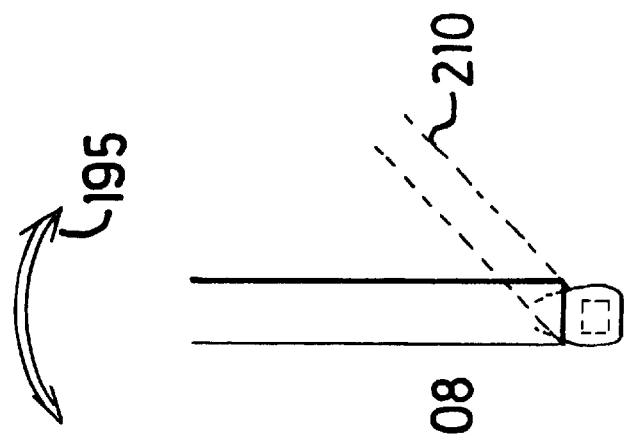
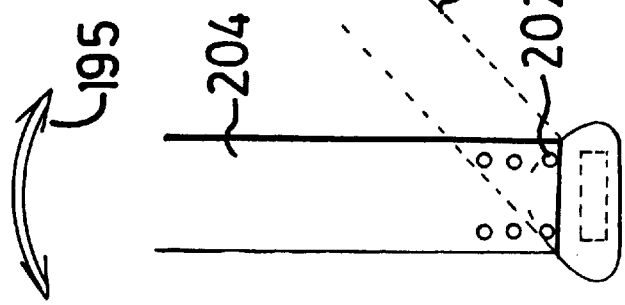
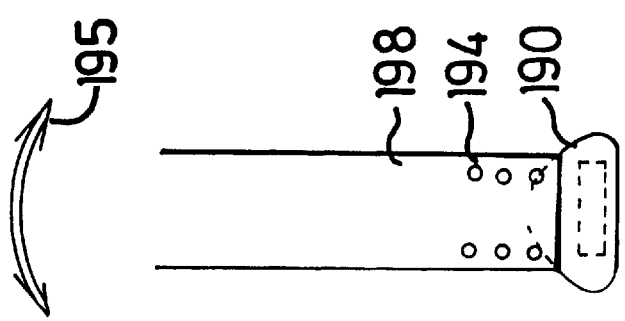
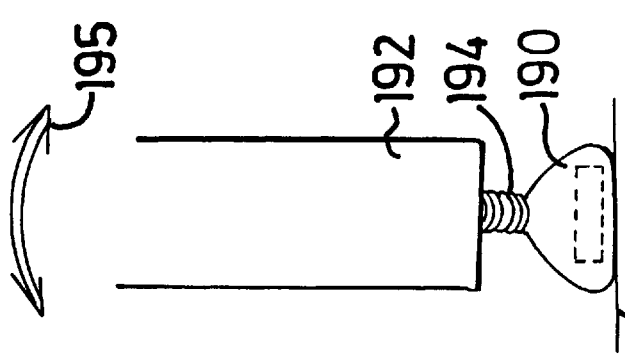

ARTICLE RECOGNITION AND VERIFICATION

FIELD OF THE INVENTION

This invention concerns methods and apparatus for identifying articles to allow verification and authentication, particularly articles formed predominantly from non-magnetic material and incorporating magnetic fibres having recognisable magnetic properties. The invention is of particular application in the field of high value documents such as original Agreements, bank notes, value coupons, bonds, passports and the like. However the invention is not limited to such documents and is equally applicable to the recognition and authentication of any nonmagnetic article in which identifiable magnetic particles have been embedded.

RELATED APPLICATION

It has been proposed in EP 96203529.1 filed Dec. 12, 1996 to incorporate magnetic particles of particular shape and magnetic properties as a security feature in articles which need to be recognised. Hitherto the proposal has been linked to the inhibition of photocopying of high value documents such as bank notes by colour copiers and the proposal has been to incorporate a suitable sensor in a colour copier which automatically detects the presence of the magnetic particles or fibres in a document placed on the copying platen. Upon detection of such a document, the sensor is arranged to generate a signal which is utilised within the copier to defeat the copying of the article either by inhibiting the copying function of the machine or degrading the copy so that the article is not reproduced accurately by the copying process.

The detection system on the colour copiers has been achieved with a multi-sensor head mounted on a scanning carriage. The gap between the sensor and the documents is defined from a combination of the glass or platen thickness, a tolerable gap between the scan head and the glass and the depth of focus of the optical system above the glass. This means that the multi-sensor has to work at a distance of a few cm. With the combination of distance and an air core for the magnetic scanning head it was originally noted that with an acceptable coil mass, size and power consumption this would result in a maximum magnetic field, which would mean that the magnetic particles would ideally need to saturate below 1000 A/m, i.e. have a magnetic saturation field $H_s$ below 1000 A/m.

The terms "magnetic saturation field $H_s$" are herein defined as the applied magnetic field at the onset of saturation of the flux density in the ferro-magnetic particles, above which point the variation of the flux density in the particles with the applied field becomes substantially non-linear. In addition it was noted that saturation at the levels of practicable fields could not be achieved unless the demagnetisation factor N was smaller than 1/250, preferably smaller than 1/1000 in order to allow for the typical levels of permeability which result from hard drawing materials such as Permalloy. This meant that long thin particles were needed and that round ones would not be suitable.

The demagnetisation factor N is defined in the following well known formula:

$$H_{in} = H_{app} - N \times M$$

where M is the magnetisation of the material, $H_{app}$ is the applied magnetic field, $H_{in}$ is the magnetic field inside the material and N is the demagnetisation factor.

Summarizing other magnetic propties, the magnetic particles had:

i) a magnetic saturation field $H_s$ being greater than 100 A/m, preferably greater than 200 A/m and most preferably greater than 300 A/m; this lower value is chosen not to trigger off EAS (electronic article surveillance) alarms ii) a magnetic saturation flux density $B_s$ being greater than 0.1 Tesla;

iii) a magnetic dynamic permeability $\mu_d$ ranging from 10 to 10000. The term magnetic dynamic permeablity $\mu_d$ is defined here as the ratio of the flux density, to the magnetic field times the permeability of free space, at the onset of saturation.

BACKGROUND OF THE INVENTION

U.S. Pat. No. 5,749,946 discloses a method for checking the authenticity of a security article by detecting the magnetic resonance of an authenticating substance at a resonance frequency.

SUMMARY OF THE INVENTION

The sensor proposed for this application is a magnetic field emitting and detection device adapted for "point of transaction" verification, e.g. where security articles are exchanged for the purpose of goods, services or money. "Point of transaction" locations may be shop tills, Banks and Building Society counters, Ticket issuing offices at railway stations, Bureau de Change, and the like.

An object of the present invention is to provide a compact apparatus which includes a sensing head adapted to be brought into close proximity or actual contact with an article which is to be recognised so that an electrical signal can be generated in response thereto for authenticating the article which is to be presented to the sensing head.

It is also an object of the invention to provide hand held, finger, or thumb mounted devices, for use at point of transaction locations typically in combination with a housing containing a power supply, signal processing and alarm means, for the same purpose.

It is another object of the invention to provide a method of applying a sensor to articles which may or may not contain magnetic fibres or particles to allow an electrical signal to be generated to indicate whether or not the particles are present in the article concerned.

According to one aspect of the invention, there is provided a method for checking the authenticity of a security article containing at least one magnetic element such as magnetic particles having a magnetic saturation field $H_s$ being greater than 100 A/m. The method comprises the following steps:

(a) generating an alternating field of one or more fundamental frequencies with an amplitude being greater than the saturation field of the magnetic element;

(b) subjecting an article to be detected to the field;

(c) detecting a detection signal emanating from the article to be detected;

(d) examining the detection signal for the presence of any particular harmonics of the fundamental frequencies or of any linear combination of the fundamental frequencies and of the harmonics, the particular harmonics or the linear combination being indicative of the presence of the magnetic element as magnetic particles.

Or, viewed from still another angle, there is provided a method of making a verifiable article which is to be detected by subjecting it to an alternating magnetic field to determine whether there is at least one specific harmonic response generated by interaction between the article and the field due to the non linear response of the flux density with the applied field from particles of magnetic material associated with the article. The method is characterised by selecting the magnetic material properties and the shape of the particles so that they have a magnetic saturation field greater than 100 A/m (preferably greater than 300 A/m) so as to prevent triggering off electronic article surveillance (EAS) systems which also include magnetic fields, and incorporating said particles into the said article.

According to another aspect of the present invention, there is provided a system by which security articles can be verified, wherein authentic articles have incorporated therein particles of a selected magnetic material and selected shape, the particles being saturable by an alternating magnetic field thereby to generate at least one harmonic of the fundamental frequency of the alternating field, and wherein a sensor is provided, a first part of which generates a local alternating magnetic field to which articles as aforesaid are to be subjected for verification, and a second part of which generates by induction electric signals indicative of the response of the material making up the article to the said alternating field. Signal analysing means is provided, adapted to determine if a particular frequency, or a spectrum of frequencies, is present in the generated signals. The system is characterised in that the selection of the magnetic material and the selection of the shape of the particles is restricted to particles which require magnetic fields in excess of 100 A/m (preferably in excess of 300 A/m) before they become saturated, to prevent authentic articles as aforesaid from triggering electronic article surveillance alarms, and the first part of the sensor generates a local field of sufficient strength to saturate any such particles if in "close proximity" to, or in contact with, the sensor.

According to still another aspect of the invention, there is provided an apparatus for carrying out a method according to the invention or for use in a system according to the invention.

More particularly, the invention provides a method of checking the authenticity of an article in which a sensor is moved into "close proximity" or contact with the article. A confirmation of authentication signal which may be audible or visible or vibratory or any combination hereof is generated if magnetic particles or fibres having the requisite property are detected as being present in the article.

Within the context of the present invention the terms "close proximity" mean at a distance smaller than 10.0 mm, typically smaller than 2.0 mm, e.g. at a distance smaller than 1.0 mm.

A consequence of this very small distance is that it can be possible to have a design which could even saturate spherical particles, i.e. particles having a demagnetisation factor N smaller than $1/3$, e.g. smaller than $1/20$.

However, a very important issue for an anti-counterfeit solution is to make the security feature itself as difficult as possible to copy. With the approach proposed in EP 96203529.1, the security feature is an elongated magnetic particle such as a hard drawn metal fibre of a particular composition and of a diameter preferably less than 30 micron. This security feature is much more difficult to imitate than spherical magnetic powders. Moreover, the particular characteristics of the metal fibres enable them to be virtually hidden in a substrate such as paper or plastic, not break out of the substrate with normal flexing usage and life, and which can be made to produce a very characteristic signal. The latter objective is enabled by using material with a particular coercivity, permeability and shape which provides a magnetic saturation field substantially greater than that found in EAS gates and which is substantially less than found with other common objects (including for example magnetic powders.

Therefore, in a preferable embodiment of the present invention, the demagnetisation factor N is—still—smaller than $1/250$ and it has been found convenient to limit the magnetic saturation field to approximately 1000 A/m to 2000 A/m at a distance of 1.0 mm above the poles of the sensor head.

The invention also lies in a method of checking the authenticity of an article such as a security document in which the article is moved into close proximity or contact with a sensor or in which the sensor is moved into close proximity or contact with the article.

The invention also lies in a method in which relative movement is introduced between the article and the sensor so that if perchance a region which is devoid of the magnetic particles or fibres is in registry with the sensor, the movement will cause a region which does contain the fibres or particles to be moved into proximity with the sensor either by movement of the sensor relative to the article or by the article relative to the sensor, to allow the authentication signal to be generated.

It is of advantage if the sensor does not have to be any larger than necessary, particularly if it is to be associated or incorporated in a till or if it is to be incorporated in a hand-held device equivalent to a pen, and since the distribution of the magnetic particles or fibres throughout the article may not be uniform, the method involving relative movement, between the sensor and the article overcomes the possible problems associated with viewing only a restricted area of the article by a small sensor.

The method of the invention is of primary application in the authentication of bank notes which have been printed on sheet material containing the said magnetic fibres or particles. However the invention is not limited to bank notes and the method of the invention is equally applicable to the authentication of any article formed from non-magnetic material containing the magnetic particles or fibres having the special magnetic properties.

In each of the methods as aforesaid, the sensor comprises a transmitting device which generates an alternating magnetic field of one or more fundamental frequencies and a detection system having an enhanced response to magnetic field variation at a frequency which is a harmonic of the fundamental frequencies or of any linear combination of the fundamental frequencies of the transmitted alternating field, and which is a predominant component of a secondary magnetic field generated by the magnetic particles or fibres as a result of a non-linear magnetic response of the material forming the particles or fibres to the transmitted alternating magnetic field.

The preferred method of the invention thus comprises the steps of generating a primary alternating magnetic field at a first frequency, introducing into a region containing a concentration of magnetic flux of the first alternating field an article containing at least one magnetic element having a non-linear magnetisation response to magnetic field changes at the frequency of the alternating field, thereby to introduce a secondary field variation at at least one harmonic of the fundamental frequency, into the magnetic field, detecting the secondary magnetic field variation generated by the non-linear response of the magnetic element to the changes of field due to the primary alternating field, generating electrical signals at the harmonic frequency due to the secondary magnetic field generated by the said non-linear response, selectively processing electrical signals generated by the harmonic frequency field and characteristic of the non-linear response, as opposed to electrical signals generated by the primary alternating magnetic field, detecting for the presence of electrical signals at the said harmonic frequency and generating a signal if such signals are detected.

An authentication signal can thus be generated if the relevant harmonic is detected in the processed signal, and the absence of any such harmonic will result in no authentication signal being generated, which can be taken to indicate that there are no appropriate magnetic elements (such as fibres or particles) within the article.

According to a preferred feature of the method, inductor means is provided proximate to an article to be detected and a generally sinusoidal electric current is caused to flow in the inductor means to generate a primary sinusoidally varying magnetic field which links the article proximate thereto, input signals for the selective signal processing system are derived from the inductor means, and the signal processing system is adjusted so as not to respond to electrical signals at the fundamental frequency of the sinusoidal alternating current producing the primary magnetic field, or low harmonics thereof, but to be significantly responsive to electrical signals at frequencies equivalent to at least one selected higher harmonic of the said alternating current frequency. Magnetic particles or fibres situated in the primary magnetic field are detectable if they have a non-linear magnetic response at the fundamental frequency so as to generate a secondary varying magnetic field at the selected higher harmonic to which the signal processing system is responsive, provided the inductor means is also linked by magnetic flux of the secondary magnetic field generated by the non-linear response of the particles in the fibres.

In one method the inductor means comprises at least two separate windings and the primary magnetic field producing alternating electric current is supplied to one of the windings and at least one secondary winding intimately associated with the primary winding provides electrical signals for the signal processing system due to voltages induced by a linking of the secondary winding by the secondary magnetic flux generated by the non-linear response particles or fibres in the article under test.

In a second method, a single winding may be used to which the primary alternating current is supplied for generating the primary field and from which electrical signals are delivered to the processing system, which by virtue of its response, will not respond significantly to electrical signals at frequencies close to the primary current frequency, but will respond to higher harmonics which will only be present if fibres or particles having the particular non-linear characteristic are linked by the alternating magnetic flux generated by the primary currents.

The invention also lies in a sensor and an apparatus for performing the invention as aforesaid.

In one embodiment of such an apparatus, a platform is provided on which an article can be placed for checking, the platform incorporating at least one sensor for generating and transmitting a primary alternating magnetic field towards and into the article and for responding to the secondary alternating magnetic field returning from the article. The alternating magnetic field returning from the article has a frequency component significantly higher than the frequency of the field transmitted to the article. Signal processing circuit means is provided responsive to electrical voltages induced by the returning flux at said higher frequency and which is adapted to respond predominantly to signals at that frequency to generate an authentication signal. This will only occur if magnetic flux at that frequency is present in the sensor due to the returning magnetic field generated by the non linear response of the magnetic particles or fibres to the primary field. The invention could also make use of more than one of the harmonic frequencies generated by the magnetic particles or fibres to improve sensitivity or aid in the discrimination of forgeries which try to copy the magnetic characteristics of the particle or fibres described in this application.

Where the sensor is very small in cross-sectional area so that only a small area of the article registers therewith, means may be provided for moving the sensor relative to the platform (and therefore the stationary article thereon) to enable different regions of the article to be detected by the sensor during a single test.

Alternatively the platform may be such that an article can be moved across the surface thereof in a wiping action, such that a surface of the article is in close proximity with, if not in contact with the sensor located therein. In this way different regions of the article will be presented in succession to the sensor without the need for the sensor to be moved relative to the platform or the article thereon. This is of particular value where the article is a flexible sheet material such as a bank note.

The platform is conveniently formed from a thin non-magnetic, e.g. plastic, sheet or membrane over the pole pieces of the sensor. Alternatively the pole pieces themselves could form the platform. In a preferred embodiment the platform is part of, or all of, the surface of a small box which may contain the signal processing electronics and the indicator which is activated if the higher harmonic magnetic flux is detected due to the presence of magnetic fibres or particles in the article under test. The indicator could be a sounder, or a lamp or both. The box could contain its own power supply or be supplied from an external source.

In another embodiment of the invention, a sensor may be located in the end of an elongated pen-like member which can be held between finger and thumb in the manner of a writing instrument and can be drawn across the surface of an article to be detected as if the sensor were being used to draw a line across the said surface.

In one embodiment the invention can thus be said to provide a sensor pen which can be picked up and used to check an article as aforesaid, and such a sensor pen may include a push button switch for activating the device so that the sensing of an article is restricted to when the button is depressed, for example by the user's forefinger.

The elongate pen-like device may serve to house electric circuit means associated with the selective signal processing or vibrator system, and a sounder, or lamp, or both, which is or are activated if the higher harmonic magnetic flux is detected due to the presence of magnetic fibres or particles in the article under test. The elongate member may also incorporate an own supply such as a battery for powering the device.

Alternatively the sensor pen may be connected by a cable to a subsidiary unit which may be a separate box containing power supply and/or electronics and/or sounder and/or lamp, and may be a device such as a cash register, or computer as used by a cashier in a bank or building society.

Alternatively the sensor may comprise a document screening device in the form of a cheque reader or the like to which a document such as a passport can be presented.

Where it is permissible to make contact with the surface of the article and to allow light pressure to be exerted thereon, the sensor may be mounted in a separate housing which is resiliently movable relative to a main housing, and switch means is operable from an open to a closed condition by relative movement of the sensor housing as will occur if the sensor housing is pressed lightly into contact with an article to be detected or vice versa. In this way the user does not have to depress a switch to render the device operational. The switch may comprise mechanical contacts or may be a capacitive switch which consumes little power. Since it is important that the switch is closed for the device to function correctly, the device may be adapted to produce a first tone or illuminate a first lamp when the switch is closed, and to generate a second tone in place of the first tone (or second lamp in place of the first lamp) if signals at the selected higher harmonic or harmonics of the fundamental frequency are detected by the signal processing system. The user is thus instructed by the tone or lamps as to whether or not the device is sensing the presence of appropriate fibres or particles and whether or not it is necessary to shift the device over the surface of the article in order to try and find particles or fibres within the article under test.

Utilising such a sensor, the user can be instructed to listen for a first tone and to move the sensor over the article and listen for the second tone. Only if the second tone is produced will the article be authenticated by the user.

The method is relatively fail-safe since if the first tone is not produced, the test cannot be performed in the first place, and the change from the first tone to the second tone will only occur in the presence of appropriate particles or fibres.

Preferably the first tone is at the first relatively low pitch and the second tone is at a relatively higher pitch so that it is impossible for the user to mistakenly assume that the second tone has been produced.

According to a preferred feature of this aspect of the invention, the first tone is generated for a set period of time before the second tone can be generated even if appropriate harmonic content is detected by the signal processing system, so that the user has to listen for the first tone, before the second tone can be generated and can be heard.

According to another feature of this aspect of the invention, the second tone may be generated at a considerably greater power level than the first tone so that even in a relatively noisy environment, the second tone will be heard.

The invention is of particular application in the field of bank note checking and since these are regularly handled by a cashier wearing a thumb or finger stall, according to another aspect of the invention, a sensor as aforesaid may be incorporated in a thumb stall or finger stall which may also incorporate a miniature signal processing system and signalling device, or be connected to same, as in a wrist band to indicate when magnetic particles or fibres are present in a bank note contacted by the stall. The secondary unit housing the electronics and power supply may include audible, visual or vibratory alarms. The electronics and alarms may instead or in addition be incorporated into other equipment normally associated with the cashiers position, such as a computer or till or cash register.

Since the finger or thumb stall is of necessity brought into contact with a note in use, pressure sensitive switch means may also be incorporated in the stall as aforesaid, and an audible tone or vibration generated or a lamp illuminated in response to the detection by the sensor located in the stall of appropriate magnetic fibres or particles within the note in contact therewith.

In accordance with another feature of this aspect of the invention, the signal processing system to a thumb or finger stall may alternatively generate an inverse of the authentication signal hitherto proposed such that if the stall is in contact with a note which contains appropriate particles or fibres, no audible tone is produced by a sounder associated therewith (or with secondary apparatus to which it is linked), but in the event that the stall is pressed against a note which does not contain such fibres or particles, an alarm signal is generated. In this way the operator is not subjected to continual tones which otherwise would be generated every time a genuine note is touched by the stall, but will only be alerted when the stall is brought into contact with a note which does not generate the appropriate response and may therefore be counterfeit note.

In accordance with a further modification of the invention, the pressure sensitive switch means associated with the sensor may be arranged to extinguish a red light and illuminate an orange light when the sensor is first pressed into contact with an article to be tested. The orange light is then extinguished and a green light is produced in the event that appropriate particles or fibres are located as being present in the article, as a visual confirmation of the authenticity of the article. An alarm signal is generated in the event that with continued pressure, no particles or fibres are sensed and the orange light is not extinguished after a given period of time.

According to a preferred feature of the invention, the particles are in fact elongate fibres and during manufacture of the article the fibres are arranged so as to be substantially co-planar. Additionally the fibres may be orientated in a particular manner so that they are not only all in the same plane, but all extend parallel or perpendicular to particular directions within that plane, so that two levels of authentication can be provided, a first which merely detects whether or not the fibres are present, and a second which determines the orientation of the fibres relative to the article.

Alternatively more than two levels of identification can be incorporated with the addition of magnetic particles or fibres having a saturation field greater than 100 A/m but with sets of different magnetic properties e.g. saturation field strength, coercivity or dynamic permeability.

This latter may be of advantage for authenticating specific value documents such as different denomination bank notes, by arranging that the fibres are orientated in different directions within the sheet material, from which the bank notes are produced.

Whether or not the fibres are orientated in parallel to one direction or not, where they are substantially co-planar, albeit randomly dispersed therein, the alternating magnetic field produced by the sensor is advantageously arranged so that the magnetic field generated by an alternating electric current is orientated substantially in the plane in which the magnetic fibres have their major axes, and the detector system associated with the sensor is arranged to pick up emissions from the magnetic fibres as they are driven through the non-linear region of their B-H curve by the alternating magnetic field.

Alternatives to inductive coils for detecting magnetic fields produced include Hall effect, magneto-resistive, magneto-inductive, flux-gate and magneto-impedance sensors. These have an advantage over inductive coils where the frequencies to be detected are low, as these alternatives have a frequency response extending down to 0 Hz.

In one embodiment of sensor, an inductor is provided comprising a coil wound around the central section of a ferrite core having a so-called E section.

In another preferable embodiment, a so-called pot core is employed, in which comprises a cylindrical ferrite cup incorporating a central ferrite core which has the coil wound around it. In both cases (the E-section and the pot core) where two or more windings are required, these are all located on the central section.

The advantage of the E core and pot core design is that they produce a concentration of magnetic flux in a plane just above the exposed end of the central core, so that magnetic flux bridging between the central core and the outer ferrite section will be most concentrated in a plane parallel to the open end of the pot core. Advantageously sheet material such as a bank note or other document to be detected, is located in that plane.

The ferrite material from which the core and surrounding pot are formed is preferably selected so that it limits and preferably minimises the generation of harmonics of the fundamental drive field.

According to another aspect of the invention, the signal processing system incorporates a narrow bandpass filter restricted to one or more of the higher harmonics of the drive magnetic field. Typically one of the harmonics is isolated by the use of such a narrow bandpass filter.

According to a preferred feature of the invention, a surface acoustic wave filter such as is commonly used in radios may be incorporated in the signal processing system.

The latter signal processing system advantageously may in addition to or instead of the acoustic wave filter incorporate a phase sensitive detector using a reference frequency locked to the primary drive field frequency so ast to produce maximum rejection of unwanted frequencies and maximum separation of desired harmonics.

Apparatus embodying the invention may be incorporated into a cash register or till, or computer terminal as provided to a teller or clerk in a building society or bank.

The invention thus also lies in a cash register or till or computer terminal when modified to include a document reader adapted to sense the presence within a document presented thereto of specific magnetic fibres or particles having a non-linear magnetic response to alternating magnetic flux at particular frequencies so as to generate in response thereto magnetic flux at one or more harmonics of the frequency of the energising magnetic field.

An embodiment of the invention also lies in the provision of a datalink to a central computer by which information identifying the document such as denomination and serial number can be stored against time and date, and till, or address, at which the forged document has been submitted, and which may also include details of the person tendering the forged note. This information may be entered by the bank clerk or cashier, or may be an electronic photographic representation of the person taken by a hidden camera such a miniature CCD TV camera located adjacent the till or cash point so that an electronic image of the person tendering the forged note can be obtained and transmitted to the central computer and stored in association with the other data relating to the transaction.

BRIEF DESCRIPTION OF THE DRAWINGS

The invention will now be described by way of example with reference to the accompanying drawings in which:

FIG. 1 illustrates a conventional cash register;

FIG. 2 illustrates a point of sale bank note checking device linked to a conventional cash register with the sensor showing in side elevation;

FIG. 3 is a plan view of the top side of the sensor of FIG. 2;

FIG. 8 illustrates another device similar to that shown in FIG. 4;

FIG. 9 is a top plan view of the device shown in FIG. 8;

FIG. 10 is similar to FIG. 7 and illustrates the internal construction of the device shown in FIG. 8;

FIG. 11 shows how a probe can be connected to the lower end of the main housing of the device such as shown in FIG. 4 by means of a spring;

FIG. 12 shows the round flat underside of the probe of FIG. 11;

FIG. 13 illustrates how the spring can accommodate an acute angle between the axis of the probe and the axis of the main body whilst allowing the probe to remain in contact with a bank note which is being checked;

FIG. 14 shows the round flat underside of the probe of FIG. 13;

FIG. 15 illustrates an alternative arrangement incorporating a spring to accommodate angular movement of the main body relative to the probe;

FIG. 16 shows the generally rectangular shape of the probe;

FIG. 17 and FIG. 18 illustrate the device shown in FIGS. 15 and 16 rotated through a right angle;

DETAILED DESCRIPTION OF THE DRAWINGS

Figure 7:
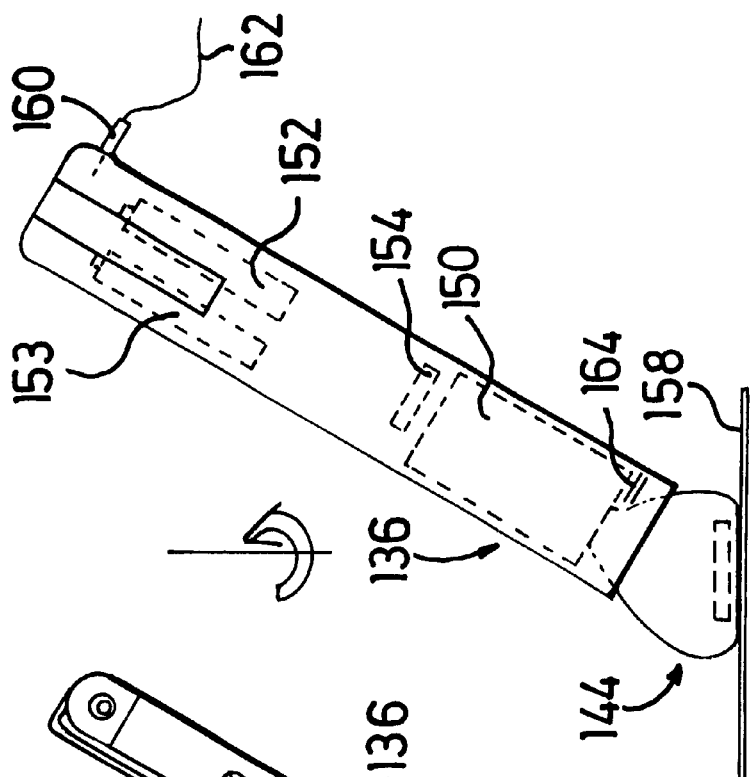
FIG. 7 is a similar view to that shown in FIG. 6 with the device rotated through 90° with the internal parts of the device shown as hidden detail.

In FIG. 1 cash till 110 such as used at payment locations in shops is fitted with a bank note authenticating device at 112 of the shelf 114 above the till drawer 116. The authentication process involves the cashier taking each bank note in turn and pressing it on an authenticating button of authentication device 112 and if accepted, laying or clipping the authenticating note on the shelf 114. The drawer 116 opens in the normal way and change can be extracted and given to the customer and the authenticated notes placed in the drawer, which can be closed ready for the next transaction.

The authenticating device is shown to an enlarged scale on FIG. 2 and it is to be understood that this could be separate from the till or as shown in FIG. 1, located at 112 on the shelf 114.

The authenticating device 112 comprises a main body 118 which may for example house one or more batteries such as 120 and a printed circuit board such as 122, and a lid 124 resiliently mounted on the base 118 by spring means (not shown) so as to be capable of up and down movement relative to the base 118 as denoted by arrow 126. Within the lid 124 is mounted an electromagnetic probe 128 which generates electrical signals for processing by the printed circuit in the event that a bank note containing appropriate magnetic material is pressed against the upper part of the lid generally designated 130.

Although not shown, a switch is provided within the two part assembly which is normally in the OFF mode, but when the lid 124 is pressed in a downward sense relative to the base 118, is switched into the ON-mode.

As shown in FIG. 3, light emitting diodes at 132 and 134 indicate the status of the sensor. Thus LED 132 is adapted to be illuminated upon pressing the lid 124 in a downward direction and LED 134 is illuminated if the item in contact with the flat platform 130 contains appropriate magnetic material.

A bleeper or buzzer or siren may be incorporated in the base unit 118 which is adapted to sound in the event that the lid 124 has been depressed and LED 132 has been illuminated, for more than for example 2 seconds or less, and no appropriate magnetic material has been sensed. This time lag would allow the operator to slide a bank note over the surface of the flat top 130 in case the first region registering with the probe 128 contains insufficient magnetic material to generate the authenticating signal.

A bank note which does not contain the appropriate magnetic material will not cause LED 134 to illuminate the continued pressure of the note on the lid 124 will then result in the sounder operating thereby alerting both the cashier and the customer to the fact that the note may be a forgery.

Although not shown, a television camera may be built into the cash register directed towards where customers stand, and a recycling video recorder may be connected to the video camera so that there will be a video record of the person who has tendered a forged note, should it become necessary for evidence purposes.

FIGS. 4 to 18 illustrate a rather different concept. Here the sensor is in the form of an elongate pen-like device which can be held between thumb and fingers by the operator and various different configurations of such device are shown.

Figure 4:
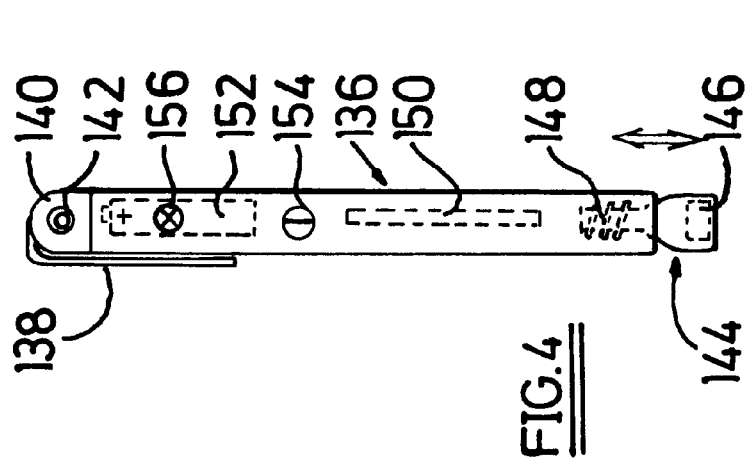
FIG. 4 is a side elevation of an alternative bank note authenticating device which may be entirely portable or used at a point of sale device such as a till or cash register.
Figure 5:
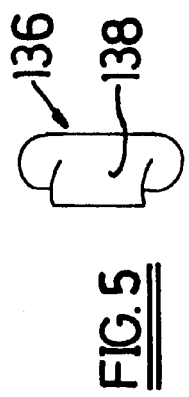
FIG. 5 is a top plan view of the device shown in FIG. 4.

In the arrangement shown in FIGS. 4 to 7, the pen body 136 is generally rectangular in plan view (as shown in FIG. 5) and includes a clip 138 which allows the device to be secured in a pocket or on a belt. The housing 136 is generally hollow and closed at its upper end by a cap 140 having a power supply socket 142 and at its other end has fitted thereto a magnetic sensor 144 containing an electromagnetic probe 146 to be described. The sensor housing 144 may be rigidly attached to the rest of the pen body 136 or more preferably attached by means of a flexible coupling generally designated 148.

Within the pen body 36 is located a printed circuit board 150 containing the electronics associated with the probe 146 and one or more batteries such as 152 which may be rechargeable cells together with a siren or buzzer or vibrator 154. A LED 156 is also shown in the pen body 136 which indicates the status of the device.

Figure 6:
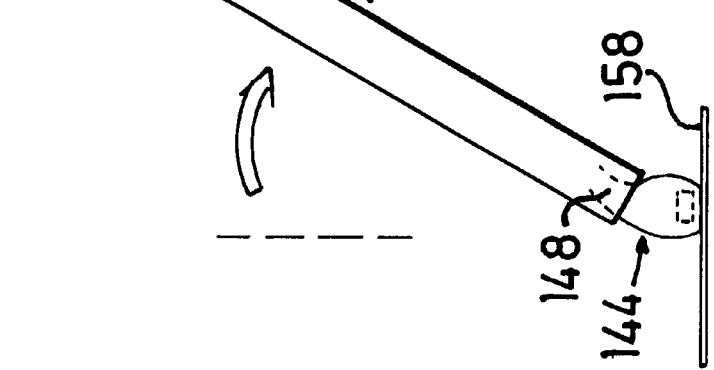
FIG. 6 illustrates how a universal coupling between a probe and the main body of the device of FIG. 4 allows the device to be held at a more conventional angle by the user.

FIG. 6 shows how the flexible coupling 148 allows the main body 136 to be tilted relative to the sensor housing 144 whilst the latter remains in face to face contact with a document such as a bank note 158 laid flat on a smooth support surface.

A flexible coupling allows the housing 144 to tilt relative to the pen body 136, however the latter is held, as indicated by FIG. 9, where the pen body 136 is shown with its wider width dimension co-planar with the plane in which the housing has been angled. The various items shown in FIG. 4 are identified by similar reference numerals where they appear in FIG. 7, which illustrates how a second battery 153 can be accommodated and also illustrates a power jack 160 connected into the socket 142 for connection via a flexible cord 162 to a separate DC source, to allow the batteries to be charged and/or the unit to be used without a drain on the batteries.

FIG. 7 also illustrates how an ON/OFF switch designated 164 can be incorporated in the lower region of the pen body 136 with an actuator arm (not shown) adapted to be engaged by the probe or sensor housing 144 when the pen body 136 is pressed in a generally downward sense relative to the sensor housing 144.

Preferably the ON/OFF switch is operation into the ON mode by such relative movement whether the pen body 136 is angled relative to the surface of the document 158 or not.

FIGS. 8, 9 and 10 illustrate a further arrangement in which the pen housing is generally cylindrical in cross-section as denoted by reference numeral 166 and again includes a clip 168 for securing the pen-like device in a pocket or on a belt. A status and pass or fail LED is denoted at 170 and the electromagnetic probe 172 is mounted at the lower end of a bellows extension 174, the upper end of which is secured to the lower open end of the housing 166. The upper end of the housing 166 is closed by a cap 176 which contains a power supply socket 178 similar to item 142 in FIG. 4.

The bellows extension 174 is normally stretched to its maximum extent by a helical spring 180 situated within the bellows.

Contact rings 182 and 184 provide a simple arrangement for turning the device ON and OFF. As shown, the rings are separated and the device is OFF. By pushing the lower end of the device 186 into contact with a flat surface such as 188 as shown in FIG. 10, and then tilting the housing 166 as shown in FIG. 10, the two rings 182 and 184 come into contact and energise the device.

The inside of the housing 166 is similar to that of FIG. 4 and same reference numerals are used to denote the similar components.

Different arrangements for a flexible coupling between a probe housing 190 and a main body 192 are shown in FIGS. 11 et seq.

In FIG. 11 a helical spring 194 connects the probe or sensor housing 190 to the lower end of the main housing 192 and if the latter is angled in the plane of the paper as denoted by arrow 195, the spring 194 permits the two parts 190 and 192 to become angled quite significantly whilst the underside of the probe housing 190 remains in flush contact with a flat surface such as 196.

The underside of the probe housing 190 is shown at 200 in FIG. 12.

An alternative but similar arrangement is shown in FIG. 13 in which the main housing 198 now extends in a downward sense to engage the generally pyramidal surface of the probe housing 190 and the spring 194 serves the same purpose as in FIG. 11 but because the lower end of the housing 198 is in contact with the probe housing 190, the arrangement is less susceptible to damage than would be the case of the arrangement shown in FIG. 11.

The underside of the probe housing 198 is shown at 200 in FIG. 14.

The arrangements shown in FIGS. 11 to 14 are of generally circular cross-section so that the angling of the main housing relative to the probe housing can be effected in any direction.

A coiled spring flexible coupling however is not restricted to such an arrangement and a spring coupling 202 is shown in FIGS. 15 to 18 joining a generally rectangular section main housing 204 to a similar generally rectangular probe housing 206 the cross-section of which is best seen in FIG. 18. The arrangement is such that the main housing 204 can be angled so as to adopt the position shown at 208 in FIG. 15, and 210 in FIG. 17 whether it is being angled with its major dimension parallel to the axis of pivoting or perpendicular thereto as in FIG. 17.

Figure 19:
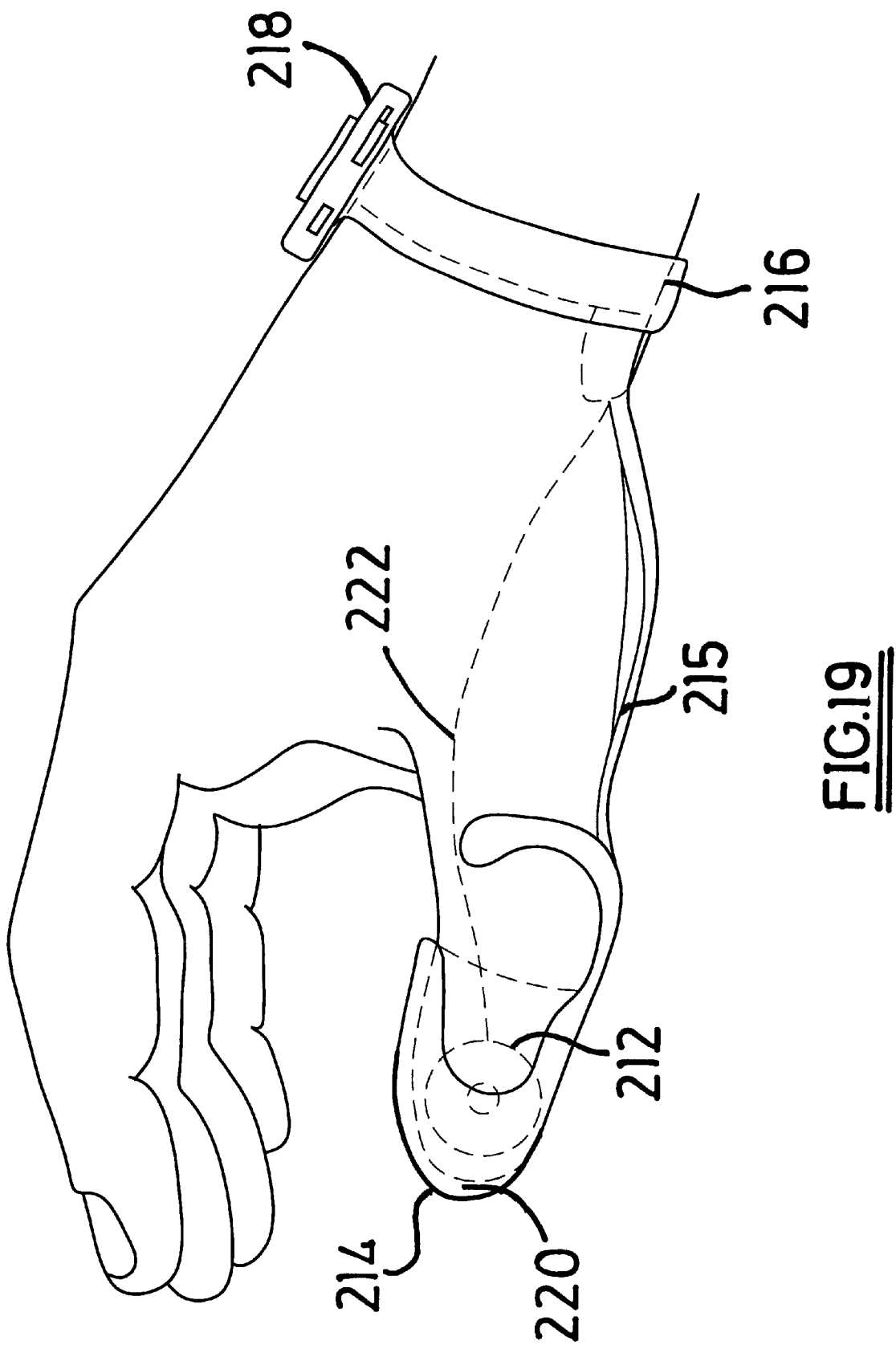
FIG. 19 illustrates another embodiment of the invention in which the sensor is incorporated into a thumb stall.

FIG. 19 illustrates a further development of the invention in which an electromagnetic probe shown in dotted outline at 212 is incorporated into a thumb stall 214 adapted to be worn by a cashier. The stall includes a flexible link 215 connecting it to a wrist band 216 similar to a wrist watch and in place of the watch a housing is carried by the wrist band at 218 within which is located the electronics, a battery and a vibratory device.

The latter may produce a sound or may simply be arranged to vibrate against the wrist of the user.

In a first mode the electronic circuit may be adapted to cause the vibration if a note in contact with the thumb stall is genuine (i.e. contains appropriate magnetic material). In a second alternative mode it only vibrates if the note is a counterfeit.

In either event, if only to conserve power, an ON/OFF membrane switch 220 is incorporated into the thumb stall so that the probe 212 is only rendered sensitive when the finger stall is pressed against a bank note or other device to be authenticated.

The wrist section preferably includes a membrane switch to allow the user to turn off the vibration once this has occurred, where the device is operating in the second mode, i.e. where the thumb stall membrane switch has been closed by pressure against a surface but no magnetic material has been sensed by the probe 212.

By arranging that the device merely vibrates but makes no sound, the cashier is alerted to the fact that the note may be a forgery without necessarily alerting the customer to the fact that this has been noted by the cashier.

The device may be used by an operator at a point of sale for checking money, for document handling as in the case of passports and the like, for packaging inspection where particular security packaging material is to used to validate packages, or in the case of ticket inspection, where appropriate magnetic materials has been incorporated into the tickets, and allows an inspector to verify that document is genuine in a covert manner.

Although shown as thumb stall, the device shown in FIG. 19 may be readily adapted alternatively as a finger stall to facilitate a bank clerk or teller who is counting and checking bundles of notes. In this event the response time of a vibrator on the wrist may not be appropriate and an alternative short response time alerting system would be required based on the operation of the ON/OFF membrane in the thumb or finger stall and the absence of a confirmatory signal from the probe, which will only exist if the material in contact with the thumb stall or finger stall contains the appropriate magnetic material. In this event an alarm can be sounded almost instantaneously so that a teller who is rapidly counting or checking a bundle of notes will be alerted instantaneously if one of the notes which is being fingered fails to produce the appropriate magnetic and electrical response.

The probe 212 needs to be connected to the wrist band and to this end a cable 222 is shown in dotted outline. By providing this on the inside of the hand, so it will be less evident that the thumb or finger stall is anything other than a conventional one.

Figure 21:
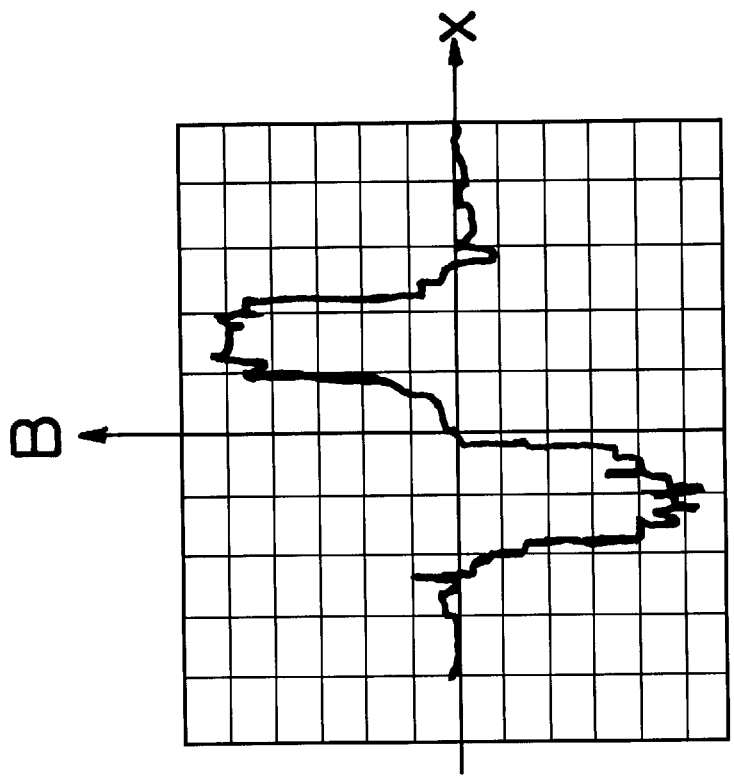
FIG. 21 shows the curve of the magnetic flux density B in a horizontal direction 0.5 mm from the surface of an E core device
Figure 20:
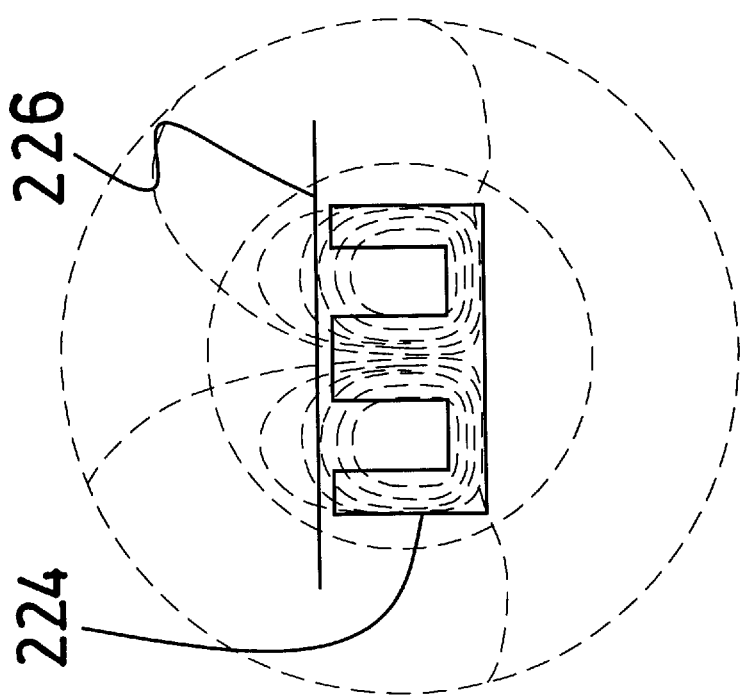
FIG. 20 illustrates the magnetic flux pattern associated with an E core.

The invention relies on a very sensitive electro-magnetic probe for its success. A large air-cored coil is not preferred and it has been found most appropriate to use a ferrite-cored coil. One type of former for such coil is an E core, that is a ferrite core in the configuration of a capital E with windings around the central stem of the E. The flux pattern associated with such a core is illustrated in FIG. 20 as reference number 224 and a security document to be detected is referred to as 226. The magnetic flux density B in function of position x for an E core device 0.5 mm from the end of the core is shown in FIG. 21.

Figure 22:
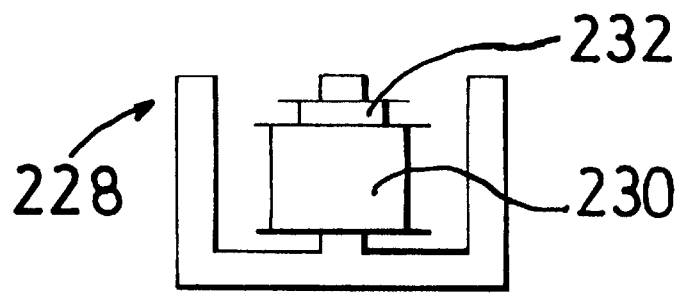
FIG. 22 is a side view of an E core device which may be used as the sensor.

An E core is shown at 228 in FIG. 22 and the drive coil is shown at 230 and the sensing or detection coil is shown at 232. Two such coils are used where it is desired to cancel out the main fundamental component of the magnetic field originating from the drive coil. Where the subsequent electrical signal processing has a sufficiently narrow bandwidth, and low frequency rejection, this may not be necessary and it is also deemed possible that a single coil may be used in practice instead of two coils.

Figure 23:
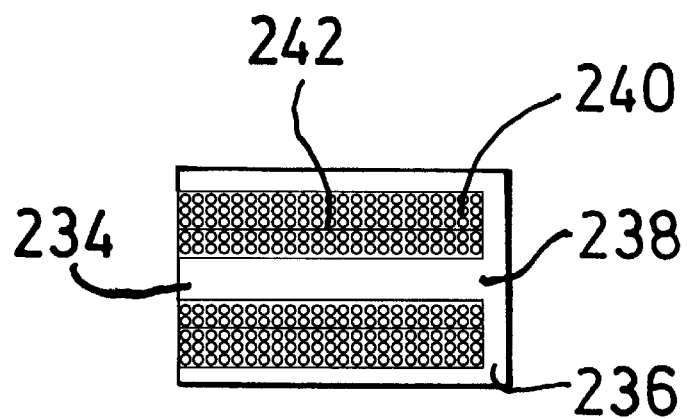
FIG. 23 is a cross-section according to plane XXXI—XXXI of FIG. 24 through a pot core device which has been found to be more advantageous than an E core.
Figure 24:
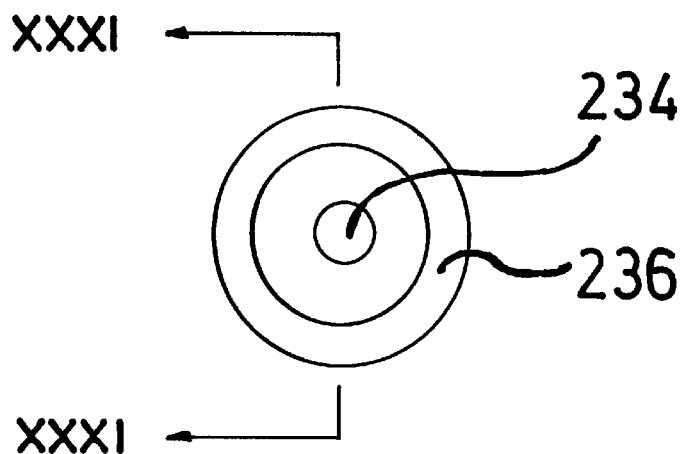
FIG. 24 is an end view of the pot core device shown in FIG. 23.

A pot core device which distributes the field in an annular ring int he sensing plane is shown in FIGS. 23 and 24. A pot core is formed effectively by rotating an E core about its central axis of symmetry. The resulting configuration comprises a central cylindrical stem 234 surrounded by a cylindrical sleeve 236 joined at the base by a cylindrical plate 238. In practice, the arrangement may be formed integrally, or from separate components as desired.

A cross-section through the pot core of FIG. 24 is shown in FIG. 23 and two separate windings of the drive coil 240 and detection 242 are shown.

Figure 25:
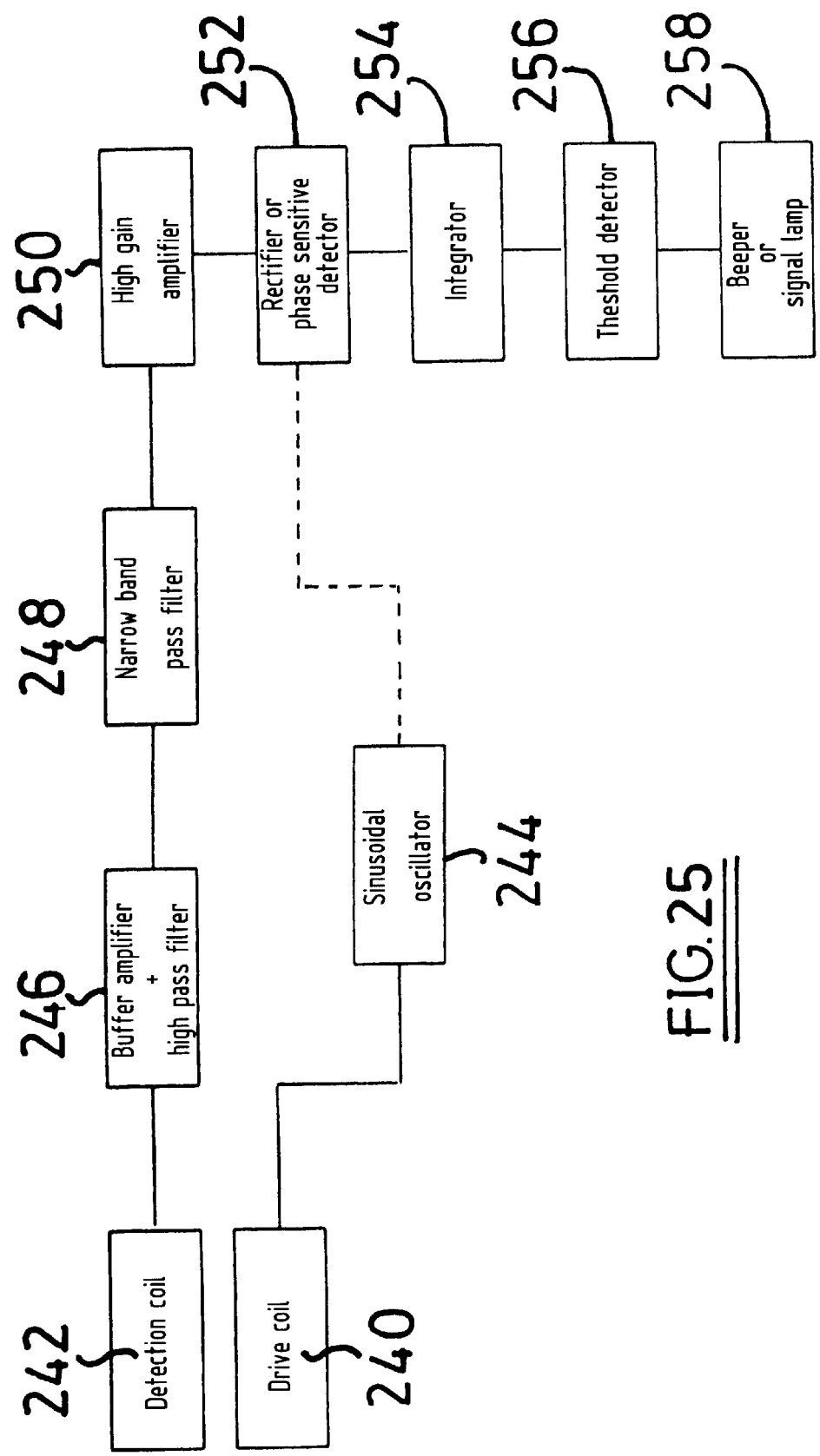
FIG. 25 is a block schematic diagram of the electronics associated with a sensor for use as a point of transaction bank note authentication device.

FIG. 25 is block schematic diagram of the electronic circuitry associated with two coils such as 240 and 242.

The drive current for coil 240 is derived from a sinusoidal oscillator 244 which may include a power output stage, and the detection coil signals are supplied via buffer amplifier and high pass filter 246 to a narrow bandpass filter 248. The latter may be a SAW filter. The filtered output from 248 is amplified by a high gain amplifier 250 and, as the electrical coupling between the previous stages of the electronics is preferably AC coupled, the output is rectified and low pass filtered or integrated by means of 252 and 254 to provide an average DC signal which is compared with a DC threshold in detector 256 to determine over a period of time equal to a few cycles of the harmonic whether or not appropriate signals have been passed by the bandpass filter 248 to indicate that the detection coil 242 is responding to a magnetic field oscillating at the appropriate harmonic of the sinusoidal oscillator 244. If so, the threshold detector 256 cause a bleeper or signal lamp 258 to operate to indicate that the item is in contact with the detection coil contains appropriate magnetic material.

In an alternative version of the circuit the rectifier 252 is replaced by a phase sensitive detector which is phase locked to the oscillator 244.

Figure 26:
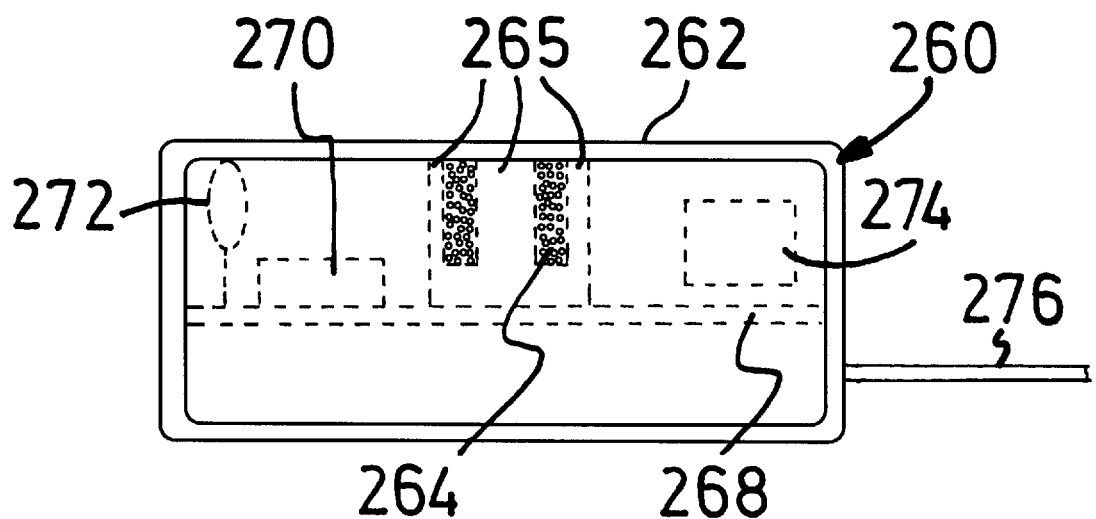
FIG. 26 shows an inner view of a basic apparatus for bank note authentication and FIG. 27 shows an upper view of this basic apparatus.
Figure 27:
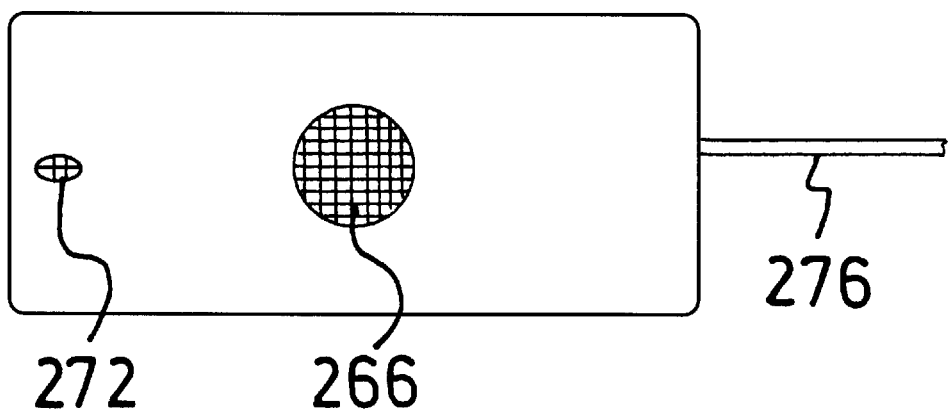

FIG. 26 and FIG. 27 show a very compact and simple version of an apparatus for use in the invention. The apparatus is suitable for use for bank note authentication. The apparatus may be used as a stand alone unit at any location or it could conveniently be located adjacent to a till in a shop or adjacent to a computer terminal in a bank or building society. The unit comprises a box 260 with a thin walled plastic portion at 262 (not shown as thin on the diagram) over a sensor 264 with magnetic poles at 265 behind a locating spot 266, which could be printed on the surface of the box 260. The box 260 contains a printed circuit board 268 with signal processing electronics 270, a visible light indicator 272, and an audible bleeper 274. The unit may be self contained for its power supply via a power cord 276. The authentication process involves the user placing a note on, or wiping a note across the locating spot 266. A genuine note containing the special magnetic particles will give a signal which causes the bleeper to sound and the light indicator to illuminate.

The magnetic material and incorporation of such material in sheet material such as security document paper is preferably as described in European Patent Application No. 96203529.1 filed on Dec. 12, 1996.

What is claimed is:

1. A method for checking the authenticity of a security article, said security article containing a plurality of randomly dispersed magnetic metal fibers, said method comprising the following steps:
   (a) generating an alternating field of one or more fundamental frequencies with an amplitude being greater than the saturation field of the magnetic metal fibers of the security article;
   (b) subjecting the security article to be detected to said field;
   (c) detecting a detection signal emanating from said security article to be detected; and
   (d) examining the detection signal for the presence of any particular harmonics of said fundamental frequency or said fundamental frequencies or of any linear combination of said fundamental frequencies and of said harmonics, said particular harmonics or said linear combination being indicative of the presence of the plurality of randomly dispersed magnetic metal fibers.

2. A method according to claim 1 wherein said magnetic metal fibers have a saturation field $H_s$ of at least 100 A/m.

3. A method according to claim 2, wherein said magnetic saturation field is greater than 200 A/m.

4. A method according to claim 3, wherein said magnetic saturation field is greater than 300 A/m.

5. A method according to claim 1, wherein said alternating field is of sufficient strength to cause a substantial nonlinear response in flux density in the magnetic element or magnetic metal fibers to generate said harmonics.

6. A method according to claim 1, wherein the detection signal is constituted by electrical signals, said method further comprising the step of selectively processing said electrical signals at said particular harmonic frequencies in preference to signals at other frequencies, detecting for the presence of signals in the output of the said selective processing and generating an authentication signal in response to the said detection.

7. A method according to claim 1, wherein said generated alternating field has only one fundamental frequency.

8. A method according to claim 1, wherein said magnetic metal fibers have a demagnetisation factor smaller than 1/20.

9. A method according to claim 8, wherein said magnetic metal fibers have a demagnetisation factor N smaller than 1/250.

10. A method according to claim 1, wherein said alternating field is a local field operating in close proximity to the article to be detected.

11. A method according to claim 10, wherein said local field is generated by means of a sensor and wherein said sensor is brought into contact with said article to be detected or wherein said article to be detected is brought into contact with said sensor.

12. A method according to claim 11, wherein a relative movement is introduced between said sensor and said article to be detected, so that if perchance a region which is devoid of said magnetic metal fibers is in registry with the sensor, the movement will cause a region which does contain said magnetic metal fibers to be moved in registry with the sensor.

13. A method according to claim 12, wherein said movement involves a wiping action of said sensor with respect to said article to be detected or vice versa to enable different regions of the article to be detected by the sensor.

14. A method according to claim 11, wherein said method further comprises an initial step of activating said sensor so that checking of an article is restricted to when said sensor is activated.

15. A method according to claim 1, wherein said method comprises a step of producing an authentication signal in case magnetic metal fibers are detected in at least one region of said article to be detected.

16. A method according to claim 15, wherein a visual authentication signal is produced.

17. A method according to claim 16, wherein said method comprises the steps of:
   a) causing a first lamp to operate when said sensor is activated and when no magnetic metal fibers are detected; and
   b) causing a second lamp to operate when magnetic metal fibers are detected.

18. A method according to claim 15, wherein an audible authentication signal is produced.

19. A method according to claim 18, wherein said method comprises the steps of:
   a) producing a first tone when said sensor is activated; and
   b) producing a second tone in place of the first tone when magnetic metal fibers are detected.

20. A method according to claim 19, wherein said first tone and said second tone are at substantially different pitches.

21. A method according to claim 19, wherein said first tone and said second tone are at substantially different power levels.

22. A method according to any one of claim 19, wherein the first tone is produced for a set period of time before the second tone can be generated so that any user has to listen initially to the first tone.

23. A method according to any one of claim 15, wherein a vibratory authentication signal is produced.

24. A method according to claim 1, wherein said method comprises a step of producing an alarm signal in case no magnetic metal fibers are detected in said article to be detected.

25. A method according to claim 1, wherein said one or each said fundamental frequency lies above 1 kHz.

26. An apparatus adapted for carrying out a method for checking the authenticity of a security article according to claim 1, said security article containing at least one magnetic element, said apparatus comprising:
   a) means for generating an alternating field of one or more fundamental frequencies with an amplitude being greater than the saturation field of the magnetic element;

b) means for detecting a detection signal emanating from said article to be detected; and c) means for examining the detection signal for the presence of any particular harmonics of said fundamental frequency or said fundamental frequencies or any linear combination of said fundamental frequencies and of said harmonics, said particular harmonics or said linear combination being indicative of the presence of said magnetic element.

27. An apparatus according to claim 26, said apparatus comprising an inductor for generating said alternating field and for detecting said detection signal.

28. An apparatus according to claim 27, wherein said inductor comprises at least two separate windings, a first winding being associated with said alternating field and a second winding being associated with a field emanating from said article to be detected.

29. An apparatus according to claim 28, wherein said winding or windings are wound around a ferrite core.

30. An apparatus according to claim 29, wherein said ferrite core has an E-section.

31. An apparatus according to claim 29, wherein said ferrite core is a pot core.

32. An apparatus according to claim 27, wherein said inductor comprise a single winding being associated with both said alternating field and a field emanating from said article to be detected.

33. An apparatus according to claim 26, wherein said apparatus comprises a Hall effect device.

34. An apparatus according to claims 26, wherein said apparatus comprises a magneto-resistive device.

35. An apparatus according to claim 26, said apparatus comprising means for examining the detection signal, wherein said means comprises a narrow bandpass filter restricted to one, or to a group, of the harmonics of the source signal.

36. An apparatus according to claim 35, wherein said means for examining the detection signal comprises a surface acoustic wave filter.

37. An apparatus according to claim 26, wherein said means for examining the detection signal comprises a phase sensitive detector so as to produce maximum rejection of unwanted frequencies and maximum separation of desired harmonics.

38. An apparatus according to claim 26, wherein said apparatus further comprises means for producing an authentication signal.

39. An apparatus according to claim 26, wherein said apparatus further comprises a document screening device to which a document to be detected can be presented.

40. An apparatus according to claim 26, wherein a sensor comprises means for activating the apparatus so that the checking of an article is restricted to when the apparatus is activated.

41. An apparatus according to claim 40, wherein said means for activating the apparatus comprise a switch operable from open to closed condition if the apparatus is pressed into contact with the article to be detected or vice versa.

42. An apparatus according to claim 26, wherein the apparatus is part of a portable device suitable for being held in a hand.

43. A portable device according to claim 42, wherein said device is in the form of an elongate pen-like member.

44. A hand-held device according to claim 42, wherein said device is in the form of a thumb stall or finger stall.

45. An apparatus according to claim 26, said apparatus further comprising a platform on which the article to be detected can be placed.

46. An apparatus according to claim 45, further comprising means for moving said sensor relative to the platform to enable different regions of the article to be detected.

47. An apparatus according to claim 26, wherein the apparatus is a part of a cash register.

48. An apparatus according to claim 26, wherein the apparatus is a part of a computer terminal.

49. An apparatus according to claim 26, wherein the apparatus is a part of an automatic vending machine.

50. An apparatus according to claim 26, wherein the apparatus is a part of an automatic bank note counting machine.

51. An apparatus according to claim 26, wherein the apparatus is a part of a bank note checking machine.

52. A method of making a verifiable article which is to be detected by subjecting it to an alternating magnetic field to determine whether there is at least one specific harmonic response generated by interaction between the article and the field due to the non-linear response of the flux density with the applied field from randomly dispersed metal fibers of magnetic material associated with the article, said method comprising the step of selecting the magnetic material properties and the shape of the metal fibers so that they have a magnetic saturation field greater than 100 A/m so as to prevent triggering off electronic article surveillance (EAS) systems which also include magnetic fields, and incorporating said randomly dispersed metal fibers of magnetic material into the said article.

53. A method as in claim 52, wherein:

a) the step of selecting includes the selection of the said magnetic material and the selection of the said shape being restricted to metal fibers which require magnetic fields in excess of 300 A/m before they become saturated.

54. A system by which security articles can be verified, wherein authentic articles have incorporated therein randomly dispersed metal fibers of a selected magnetic material and of a selected shape, said randomly dispersed metal fibers being saturable by an alternating magnetic field thereby to generate at least one harmonic of a fundamental frequency of the alternating field; and wherein a sensor is provided, a first part of which generates a local alternating magnetic field to which articles as aforesaid are to be subjected for verification, and a second part of which generates by induction electric signals indicative of the response of the material making up the article to the said alternating field; a signal analysing device is provided, configured to determine if a particular harmonic or a spectrum of harmonics, is present in the generated signals; the selection of the said magnetic material and the selection of the said shape is restricted to metal fibers which require magnetic fields in excess of 100 A/m before they become saturated, to prevent authentic articles as aforesaid from triggering electronic articles surveillance alarms, and the first part of the sensor generates a local field of sufficient strength to saturate any such metal fibers if in close proximity to, or in contact with, the sensor.

55. A system as in claim 54, wherein:

a) the selection of the said magnetic material and the selection of the said shape is restricted to metal fibers which require magnetic fields in excess of 300 A/m before they become saturated.

* * * * *